US012783098B2

(12) United States Patent
Goto et al.

(10) Patent No.: US 12,783,098 B2
(45) Date of Patent: Nov. 3, 2026

(54) SENSOR CONTROLLER INCLUDING AN ELECTRO-MAGNETIC RESONANCE SENSOR, METHOD, AND POSITION DETECTION DEVICE

(71) Applicant: Wacom Co., Ltd., Saitama (JP)

(72) Inventors: Fumitaka Goto, Saitama (JP); Hiroshi Mizuhashi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 19/017,050

(22) Filed: Jan. 10, 2025

(65) Prior Publication Data

US 2025/0231655 A1 Jul. 17, 2025

(30) Foreign Application Priority Data

Jan. 11, 2024 (JP) ................................ 2024-002893
Aug. 27, 2024 (JP) ................................ 2024-146046

(51) Int. Cl.
*G06F 3/046* (2006.01)
*G06F 3/041* (2006.01)
*G06F 3/044* (2006.01)

(52) U.S. Cl.
CPC .......... *G06F 3/046* (2013.01); *G06F 3/04162* (2019.05); *G06F 3/0441* (2019.05)

(58) Field of Classification Search
None
See application file for complete search history.

(56) References Cited

U.S. PATENT DOCUMENTS

2016/0092010 A1* 3/2016 Agarwal ............... G06F 3/0412 345/173
2016/0370915 A1* 12/2016 Agarwal ............... G06F 3/0443
2017/0075457 A1* 3/2017 Hayashi .............. G06F 3/04166
2023/0114167 A1* 4/2023 Oh ........................ G06F 3/0383
2024/0153449 A1* 5/2024 Zhong ................... G06F 3/0442
2024/0393901 A1* 11/2024 Cho .................... G06F 3/04166

FOREIGN PATENT DOCUMENTS

JP 2009265759 A * 11/2009
JP 2020074245 A 5/2020

* cited by examiner

*Primary Examiner* — Kirk W Hermann
(74) *Attorney, Agent, or Firm* — Seed Intellectual Property Law Group LLP

(57) ABSTRACT

A sensor controller connected to an electro-magnetic resonance sensor disposed to overlap with a display. The sensor controller executes a first operation for detecting, by using the electro-magnetic resonance sensor, an electromagnetic induction pen synchronously with a touch detection operation for detecting a touch made by a passive pointer in a panel surface of the display, and the sensor controller executes a second operation for detecting, by using the electro-magnetic resonance sensor, the electromagnetic induction pen synchronously with pixel driving of the display when the electromagnetic induction pen is detected. The sensor controller does not execute the touch detection operation when the electromagnetic induction pen is detected.

10 Claims, 14 Drawing Sheets

SENSOR CONTROLLER INCLUDING AN ELECTRO-MAGNETIC RESONANCE SENSOR, METHOD, AND POSITION DETECTION DEVICE

BACKGROUND

Technical Field

The present disclosure relates to a sensor controller, a method, and a position detection device, and particularly to a sensor controller connected to a sensor of the electromagnetic resonance system (EMR system), a method executed by the sensor controller, and a position detection device including the sensor controller.

Description of the Related Art

There is known a position detection device having a configuration obtained by disposing an EMR sensor for executing detection of an electromagnetic induction pen in pen input by the EMR system and a touch sensor for executing detection of a passive pointer such as a finger in touch input by the passive pointer by the capacitive system in such a manner that the EMR sensor and the touch sensor overlap with a display for displaying an image and the like. One example of such a position detection device is disclosed in Japanese Patent Laid-open No. 2020-074245.

Further, a position detection device having an EMR sensor and a touch sensor is disclosed in Japanese Patent Laid-open No. 2009-265759. This position detection device is configured to, when an electromagnetic induction pen is detected by the EMR sensor, stop position detection of a passive pointer executed by the touch sensor and execute only position detection of a pen by the EMR sensor.

Incidentally, among position detection devices of the related art that are of a type in which an EMR sensor, a touch sensor, and a display are disposed to overlap with each other, there is a position detection device in which a detection operation of a passive pointer executed by use of the touch sensor (hereinafter, referred to as "touch detection operation") is executed synchronously with pixel driving of the display (hereinafter, referred to simply as "pixel driving"), operation that is executed by use of the EMR sensor and is for detecting an electromagnetic induction pen (hereinafter, referred to as "pen detection operation") is executed synchronously with the touch detection operation, and the pen detection operation is consequently executed in indirect synchronization with the pixel driving.

In such a position detection device, when a stop of the position detection of a passive pointer like that described in Japanese Patent Laid-open No. 2009-265759 occurs, the pen detection operation becomes incapable of synchronizing with the touch detection operation. Thereupon, the pen detection operation becomes incapable of also synchronizing with the pixel driving. Therefore, there is a problem that interference occurs between a signal used for the pen detection operation (including a current signal for generating an alternating magnetic field and a current signal generated by an alternating magnetic field sent out by an electromagnetic induction pen) and a pixel driving signal used for the pixel driving of the display (including a gate signal and a source signal).

Here, among the position detection devices of the related art, there is a position detection device that synchronizes the touch detection operation with the pixel driving by generating a synchronization signal that synchronizes with the pixel driving and executing the touch detection operation synchronously with this synchronization signal. Moreover, there is a position detection device that does not stop the generation of this synchronization signal even when the touch detection operation is stopped due to detection of an electromagnetic induction pen. In such a position detection device, even while the touch detection operation is stopped, it is tentatively possible to execute the pen detection operation synchronously with the touch detection operation (that is not executed actually) when executing the pen detection operation synchronously with the above-described synchronization signal.

However, in the first place, the purpose of executing the pen detection operation synchronously with the touch detection operation in the position detection device of the related art is to prevent the pen detection operation and the touch detection operation from mutually acting as noise. Therefore, there is no need in the first place to synchronize the pen detection operation with the touch detection operation while the touch detection operation is stopped. If so, it is preferable to execute the pen detection operation in direct synchronization with the pixel driving. This can maximize the effect of suppression of the interference between the signal used for the pen detection operation and the pixel driving signal used for the pixel driving of the display. In spite of that, according to the above-described method, the pen detection operation is executed synchronously with the touch detection operation also while the touch detection operation is stopped. Thus, the synchronization between the pen detection operation and the pixel driving becomes indirect synchronization, and the interference suppression effect that should be obtained originally is not sufficiently obtained.

BRIEF SUMMARY

Therefore, embodiments of the present disclosure provide a sensor controller, a method, and a position detection device that can suppress, without fail, interference between a signal used for pen detection operation and a pixel driving signal used for pixel driving of a display.

A sensor controller according to the present disclosure is connected to an EMR sensor disposed to overlap with a display. The sensor controller includes a processor, and a memory storing a program that, when executed by the processor, causes-e a sensor controller to: execute a first operation for detecting, by using the EMR sensor, an electromagnetic induction pen synchronously with touch detection operation for detecting a touch made by a passive pointer in a panel surface of the display. The sensor controller also executes a second operation for detecting, by using the EMR sensor, the electromagnetic induction pen synchronously with pixel driving of the display when the electromagnetic induction pen is detected.

A method according to the present disclosure is executed by a sensor controller connected to an EMR sensor disposed to overlap with a display. The method includes executing a first operation for detecting, by using the EMR sensor, an electromagnetic induction pen synchronously with touch detection operation for detecting a touch made by a passive pointer in a panel surface of the display, and executing a second operation for detecting, by using the EMR sensor, the electromagnetic induction pen synchronously with pixel driving of the display when the electromagnetic induction pen is detected.

A position detection device according to the present disclosure includes a display, an EMR sensor and a touch sensor disposed to overlap with the display, and a sensor controller connected to each of the EMR sensor and the touch sensor. The sensor controller, in operation, executes a first operation for detecting, by using the EMR sensor, an electromagnetic induction pen synchronously with touch detection operation executed by use of the touch sensor for detecting a touch made by a passive pointer in a panel surface of the display. The sensor controller also executes a second operation for detecting, by using the EMR sensor, the electromagnetic induction pen synchronously with pixel driving of the display when the electromagnetic induction pen is detected.

According to the present disclosure, the pen detection operation is executed synchronously with the touch detection operation when the touch detection operation is executed, and the pen detection operation is executed synchronously with the pixel driving of the display when the touch detection operation is not executed. Therefore, it becomes possible to suppress, without fail, interference between the signal used for the pen detection operation and the signal used for the pixel driving of the display.

DETAILED DESCRIPTION

Embodiments of the present disclosure will be described in detail below with reference to the accompanying drawings.

Figure 1:
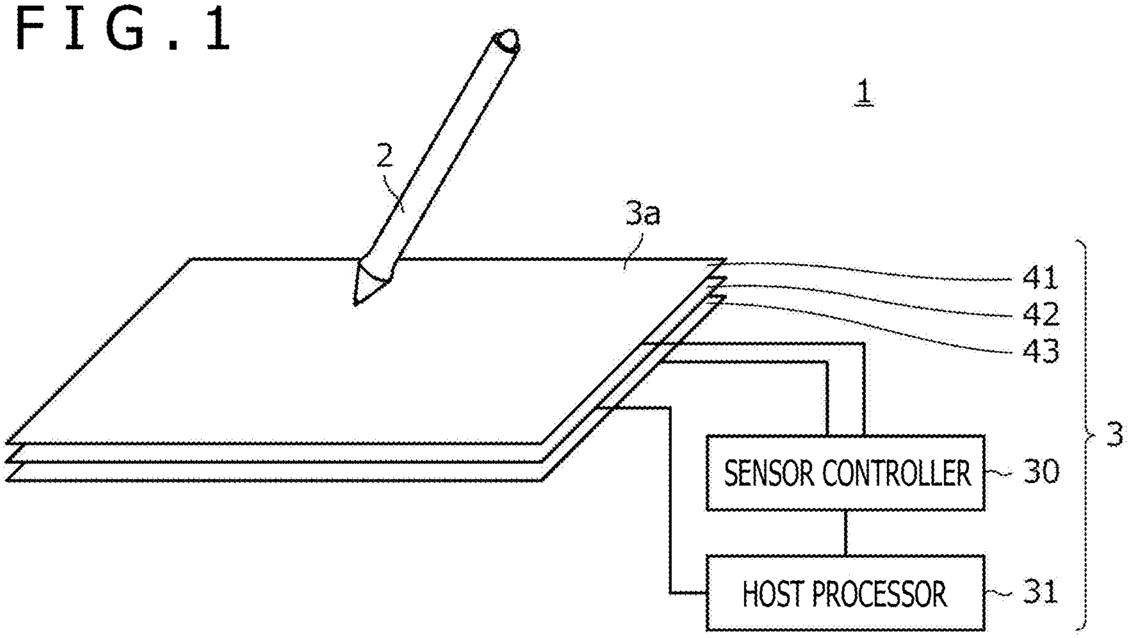
FIG. 1 is a diagram illustrating a configuration of a position detection system according to a first embodiment of the present disclosure.

FIG. 1 is a diagram illustrating a configuration of a position detection system 1 according to a first embodiment of the present disclosure. As illustrated in this diagram, the position detection system 1 has an electromagnetic induction pen 2 and a position detection device 3. The electromagnetic induction pen 2 is a pen compatible with position detection by the EMR system, and internally has a resonant circuit including a coil and a capacitor.

The position detection device 3 is a computer compatible with pen input by the EMR system and touch input by the capacitive system, and has a sensor controller 30, a host processor 31, a touch sensor 41, a display 42, and an EMR sensor 43. In a typical example, the position detection device 3 is a tablet terminal or a notebook personal computer compatible with pen input and touch input.

The touch sensor 41, the display 42, and the EMR sensor 43 are disposed to be overlapped in this order from the side of a panel surface 3*a* of the position detection device 3. This allows the panel surface 3*a* to be a display surface of the display 42 and double as a touch surface for allowing a user to execute pen input and touch input.

The touch sensor 41 is a sensor used for detecting a passive pointer by the capacitive system, and has a plurality of first linear electrodes that each extend in a first direction in the panel surface 3*a* and are arranged at equal intervals in a second direction orthogonal to the first direction in the panel surface 3*a* and a plurality of second linear electrodes that each extend in the second direction and are arranged at equal intervals in the first direction. The plurality of first linear electrodes and the plurality of second linear electrodes are each connected to a touch detection circuit 22 (described later) in the sensor controller 30.

The EMR sensor 43 is a sensor used for detecting the electromagnetic induction pen 2, and has a plurality of first loop coils that each extend in the first direction and are arranged in the second direction and a plurality of second loop coils that each extend in the second direction and are arranged in the first direction. The plurality of first loop coils and the plurality of second loop coils are each connected to a pen detection circuit 23 (described later) in the sensor controller 30.

The sensor controller 30 is an integrated circuit having a function of deriving the position of a passive pointer in the panel surface 3*a* by using the touch sensor 41 and a function of deriving the position of the electromagnetic induction pen 2 in the panel surface 3*a* by using the EMR sensor 43. The sensor controller 30 also has a function of receiving data transmitted by the electromagnetic induction pen 2. The position and the data derived and received by the sensor controller 30 are sequentially supplied to the host processor 31.

The host processor 31 is a central processing unit of the position detection device 3 and is connected to the display 42 and the sensor controller 30. The host processor 31 plays a role in executing an operating system of the position detection device 3 and various applications by executing a program read out from a memory that is not illustrated. Processing executed by the host processor 31 in accordance with the program includes processing of generating a video signal and supplying it to the display 42, various kinds of processing executed with use of the position and the data supplied from the sensor controller 30, and the like. The various kinds of processing executed with use of the position and the data include, for example, movement of a cursor displayed in the panel surface 3*a* by the display 42, generation of stroke data indicating the locus of the electromagnetic induction pen 2 in the panel surface 3*a*, and the like. Regarding the stroke data, the host processor 31 also executes processing of rendering and displaying the generated stroke data, processing of generating and recording digital ink including the generated stroke data, processing of transmitting the generated digital ink to an external device in response to an instruction by a user, and the like.

The display 42 is a display device having a plurality of pixels arranged in a matrix and a drive circuit that individually drives the plurality of pixels. In a specific example, the display 42 can be formed of a liquid crystal display, an organic electroluminescent (EL) display, electronic paper, or the like. The drive circuit of the display 42 plays a role in displaying the video signal supplied from the host processor 31 on the panel surface 3*a* by driving each pixel in accordance with the video signal.

Figure 2:
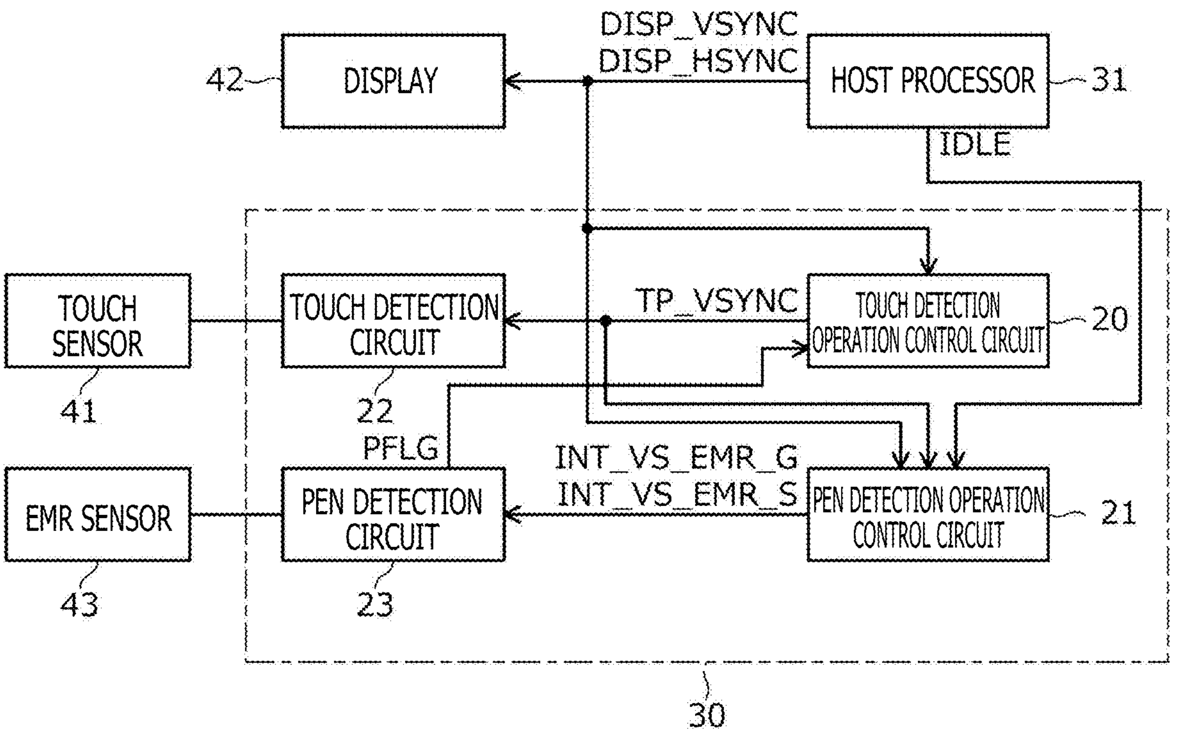
FIG. 2 is a diagram illustrating an internal configuration of a sensor controller according to the first embodiment of the present disclosure.
Figure 3:
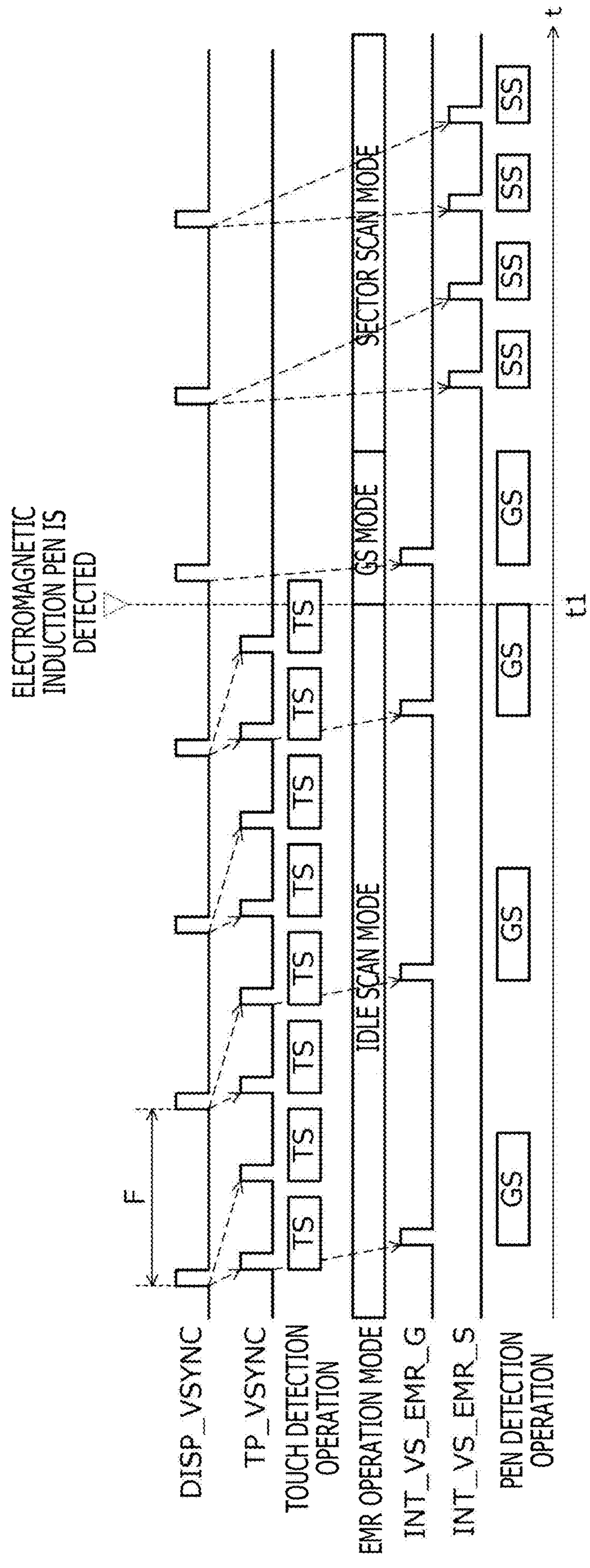
FIG. 3 is a time chart illustrating signals as well as operation and operation modes of the sensor controller according to the first embodiment of the present disclosure.

FIG. 2 is a diagram illustrating an internal configuration of the sensor controller 30. As illustrated in this diagram, the sensor controller 30 includes a touch detection operation control circuit 20, a pen detection operation control circuit 21, the pen detection circuit 23, and the touch detection circuit 22. Further, FIG. 3 is a time chart illustrating signals as well as operation and operation modes of the sensor controller 30 according to the present embodiment. The configuration and operation of the sensor controller 30 will be described in detail below with reference to these diagrams.

The touch detection circuit 22 is a circuit that plays a role in executing the above-described touch detection operation by using the touch sensor 41. Specifically, the touch detection circuit 22 transmits each of touch detection signals different from each other to a respective one of the plurality of first linear electrodes in the touch sensor 41, and causes the touch detection signal to be received by each of the plurality of second linear electrodes. Further, the touch detection circuit 22 is configured to derive the position of a passive pointer in the panel surface 3*a* on the basis of the reception result.

The touch detection operation control circuit 20 is a circuit that controls the timing at which the touch detection circuit 22 executes the above-described operation. Specifically, the touch detection operation control circuit 20 is configured to generate a touch detection operation synchronization signal TP_VSYNC indicating the operation timing of the touch detection operation and supply it to the touch detection circuit 22. As illustrated in FIG. 3, the touch detection circuit 22 is configured to execute one time of the touch detection operation (in FIG. 3, represented as "TS") every time the touch detection operation synchronization signal TP_VSYNC is activated.

Here, the host processor 31 is configured to generate a vertical synchronization signal DISP_VSYNC indicating a start timing of a frame cycle F that is the cycle of execution of display of one screen and a horizontal synchronization signal DISP_HSYNC indicating the switching timing of the video line and supply the synchronization signals to the display 42 together with the video signal. The above-described drive circuit of the display 42 is configured to drive the plurality of pixels at timings in accordance with these signals. As a result thereof, the image displayed on the panel surface 3*a* by the display 42 is updated at the frame cycle F.

The touch detection operation control circuit 20 is configured to activate the touch detection operation synchronization signal TP_VSYNC synchronously with the vertical synchronization signal DISP_VSYNC generated by the host processor 31, as illustrated by dashed arrows in FIG. 3. This causes the touch detection circuit 22 to execute the touch detection operation synchronously with the pixel driving of the display 42.

The pen detection circuit 23 is a circuit that plays a role in executing the above-described pen detection operation by using the EMR sensor 43. Specifically, the pen detection circuit 23 generates an alternating magnetic field over the panel surface 3*a* by supplying an alternate current (AC) current to one of the plurality of first loop coils in the EMR sensor 43 for a predetermined period. When the coil forming the resonant circuit of the electromagnetic induction pen 2 enters this alternating magnetic field, an electromotive force is generated across the coil, and the capacitor forming the resonant circuit together with the coil is charged. When the alternating magnetic field on the panel surface 3*a* disappears due to a stop of the supply of the AC current by the pen detection circuit 23, an AC current flows in the coil of the resonant circuit owing to power accumulated in the capacitor, and an alternating magnetic field is sent out. The pen detection circuit 23 detects an AC current (pen signal) generated by this alternating magnetic field in each of the plurality of second loop coils and acquires the detection intensity thereof. The pen detection circuit 23 is configured to acquire the distribution of the detection intensity in the panel surface 3*a* by executing the above processing on each of the plurality of first loop coils and derive the position of the electromagnetic induction pen 2 in the panel surface 3*a* on the basis of the result thereof.

The pen detection circuit 23 is configured to execute the above pen detection operation by any of a global scan, an idle scan, and a sector scan in accordance with control by the pen detection operation control circuit 21 to be described later.

The global scan is the pen detection operation executed by use of all first loop coils and all second loop coils in the EMR sensor 43. In FIG. 3, the global scan is represented as "GS." With the global scan, the electromagnetic induction pen 2 can be detected in the whole of the panel surface 3*a*, whereas it takes a relatively long period of time to execute one time of the pen detection operation.

The idle scan is the pen detection operation executed when the host processor 31 is in an idle state, and is similar to the global scan in that the idle scan is executed by use of all first loop coil and all second loop coils in the EMR sensor 43. However, the idle scan is different from the global scan in that the pen detection operation is executed at a frequency lower than that of the global scan. With the idle scan, the electromagnetic induction pen 2 can be detected only at a frequency lower than that of the global scan, but the amount of consumption of power by the pen detection operation can be reduced. Note that the idle scan is executed at a clock speed lower than that of the global scan (that is, in a longer period of time) when the host processor 31 in the idle state operates at a clock speed lower than the clock speed in the normal state.

The sector scan is, when the electromagnetic induction pen 2 has already been detected, the pen detection operation for updating the position of the electromagnetic induction pen 2 that has been detected, and is executed by use of only a predetermined number of first loop coils and a predetermined number of second loop coils present near the position that has been derived at the previous time, among the plurality of first loop coils and the plurality of second loop coils in the EMR sensor 43. In FIG. 3, the sector scan is represented as "SS." With the sector scan, it is impossible to detect the electromagnetic induction pen 2 in the whole of the panel surface 3a, but one time of the pen detection operation can be completed in a relatively short period of time.

In the following description, the operation modes of the pen detection circuit 23 in which the global scan, the idle scan, and the sector scan are executed are referred to as the global scan mode, the idle scan mode, and the sector scan mode, respectively.

The pen detection operation control circuit 21 is a circuit that controls the timing at which the pen detection circuit 23 executes the pen detection operation and that controls the operation mode of the pen detection circuit 23. Specifically, the pen detection operation control circuit 21 is configured to selectively generate either one of a pen detection operation synchronization signal INT_VS_EMR_G indicating the operation timing of the pen detection operation in the global scan and a pen detection operation synchronization signal INT_VS_EMR_S indicating the operation timing of the pen detection operation in the sector scan and supply the generated signal to the pen detection circuit 23. As illustrated in FIG. 3, the pen detection circuit 23 is configured to execute one time of the global scan every time the pen detection operation synchronization signal INT_VS_EMR_G is activated and execute one time of the sector scan every time the pen detection operation synchronization signal INT_VS_EMR_S is activated. The pen detection operation control circuit 21 causes the pen detection circuit 23 to operate in the global scan mode, by activating the pen detection operation synchronization signal INT_VS_EMR_G at a relatively high frequency, and causes the pen detection circuit 23 to operate in the idle scan mode, by activating the pen detection operation synchronization signal INT_VS_EMR_G at a relatively low frequency. The pen detection operation control circuit 21 causes the pen detection circuit 23 to operate in the sector scan mode, by activating the pen detection operation synchronization signal INT_VS_EMR_S.

Here, the host processor 31 stores a state flag IDLE indicating whether or not the host processor 31 is in the idle state. The pen detection operation control circuit 21 determines whether or not the host processor 31 is in the idle state, by referring to the state flag IDLE. When determining that the host processor 31 is in the idle state, the pen detection operation control circuit 21 causes the pen detection circuit 23 to operate in the idle scan mode, by activating the pen detection operation synchronization signal INT_VS_EMR_G at a relatively low frequency. Meanwhile, when determining that the host processor 31 is not in the idle state, the pen detection operation control circuit 21 causes the pen detection circuit 23 to operate in the global scan mode, by activating the pen detection operation synchronization signal INT_VS_EMR_G at a relatively high frequency.

The pen detection operation control circuit 21 is configured to, as illustrated by dashed arrows in FIG. 3, activate the pen detection operation synchronization signal INT_VS_EMR_G synchronously with the touch detection operation synchronization signal TP_VSYNC generated by the touch detection operation control circuit 20 in principle and, after the electromagnetic induction pen 2 is detected, activate the pen detection operation synchronization signal INT_VS_EMR_G or INT_VS_EMR_S synchronously with the vertical synchronization signal DISP_VSYNC generated by the host processor 31. Note that, since the electromagnetic induction pen 2 has been detected without fail at the timing at which the pen detection operation synchronization signal INT_VS_EMR_S is activated, the pen detection operation synchronization signal INT_VS_EMR_S is not activated synchronously with the touch detection operation synchronization signal TP_VSYNC. Accordingly, the pen detection circuit 23 executes the pen detection operation (specifically, the global scan or the idle scan) synchronously with the touch detection operation before the electromagnetic induction pen 2 is detected. On the other hand, when the electromagnetic induction pen 2 is detected by this pen detection operation, the pen detection circuit 23 executes the pen detection operation (specifically, the global scan or the sector scan) synchronously with the pixel driving of the display 42.

The reason why the pen detection operation control circuit 21 executes such operation is because the touch detection operation control circuit 20 stops the generation of the touch detection operation synchronization signal TP_VSYNC when the electromagnetic induction pen 2 has been detected by the pen detection circuit 23 in the present embodiment. This stop is executed in order to prevent the occurrence of the situation in which the touch detection operation is executed while pen input by the electromagnetic induction pen 2 is being executed and noise is mixed in stroke data as a result. The pen detection circuit 23 stores a state flag PFLG indicating whether or not the electromagnetic induction pen 2 is being detected. The touch detection operation control circuit 20 is configured to determine whether or not the electromagnetic induction pen 2 is being detected, by referring to the state flag PFLG and, in accordance with the result thereof, decide whether or not to stop the generation of the touch detection operation synchronization signal TP_VSYNC.

FIG. 3 illustrates an example of a case in which the electromagnetic induction pen 2 is detected at a time t1 at which the pen detection circuit 23 is operating in the idle scan mode. In this case, the pen detection operation control circuit 21 once causes the pen detection circuit 23 to operate in the global scan mode immediately after the electromagnetic induction pen 2 is detected. That is, the pen detection operation control circuit 21 activates the pen detection operation synchronization signal INT_VS_EMR_G synchronously with the vertical synchronization signal DISP_VSYNC. As described above, the idle scan is executed at a lower clock speed than that of the global scan in some cases. As a result, there is a possibility that the position of the electromagnetic induction pen 2 detected by the idle scan has lower accuracy than the position of the electromagnetic induction pen 2 detected by the global scan. However, the position of the electromagnetic induction pen 2 can be detected with the accuracy of the normal global scan by once causing the pen detection circuit 23 to execute the global scan. After the position of the electromagnetic induction pen 2 is detected by the global scan, the pen detection operation control circuit 21 activates the pen detection operation synchronization signal INT_VS_EMR_S synchronously with the vertical synchronization signal DISP_VSYNC. This allows the pen detection circuit 23 to update the position of the electromagnetic induction pen 2.

Figure 4:
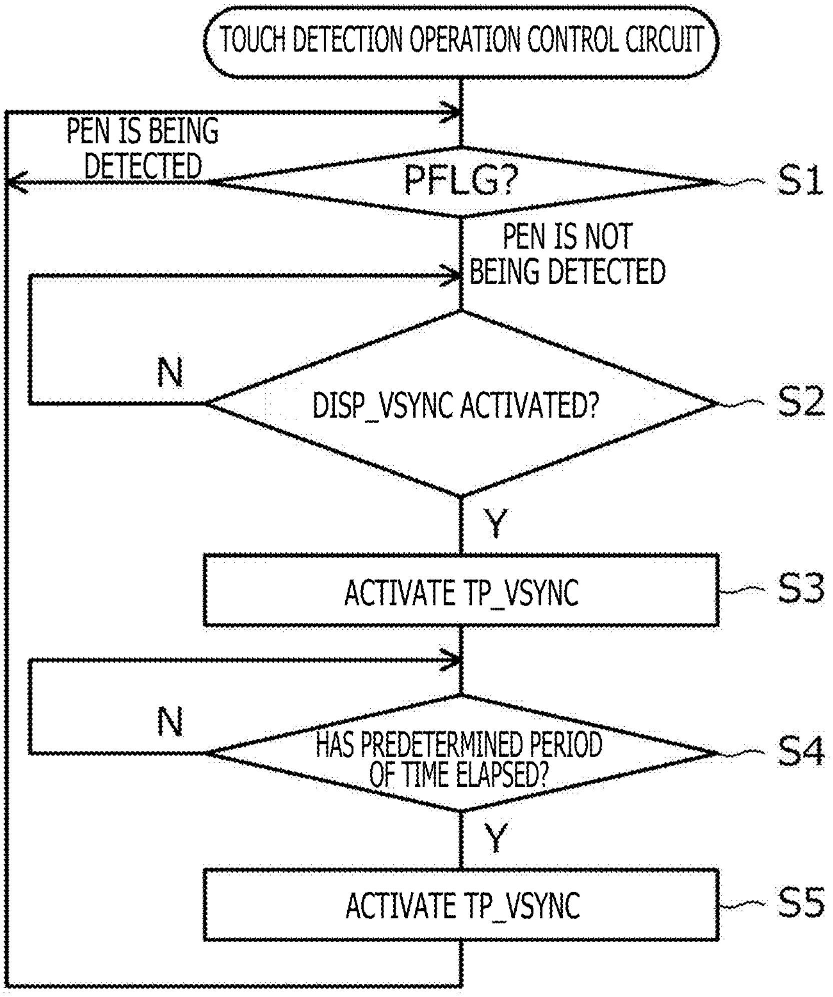
FIG. 4 is a flowchart illustrating processing of a touch detection operation control circuit according to the first embodiment of the present disclosure.
Figure 5:
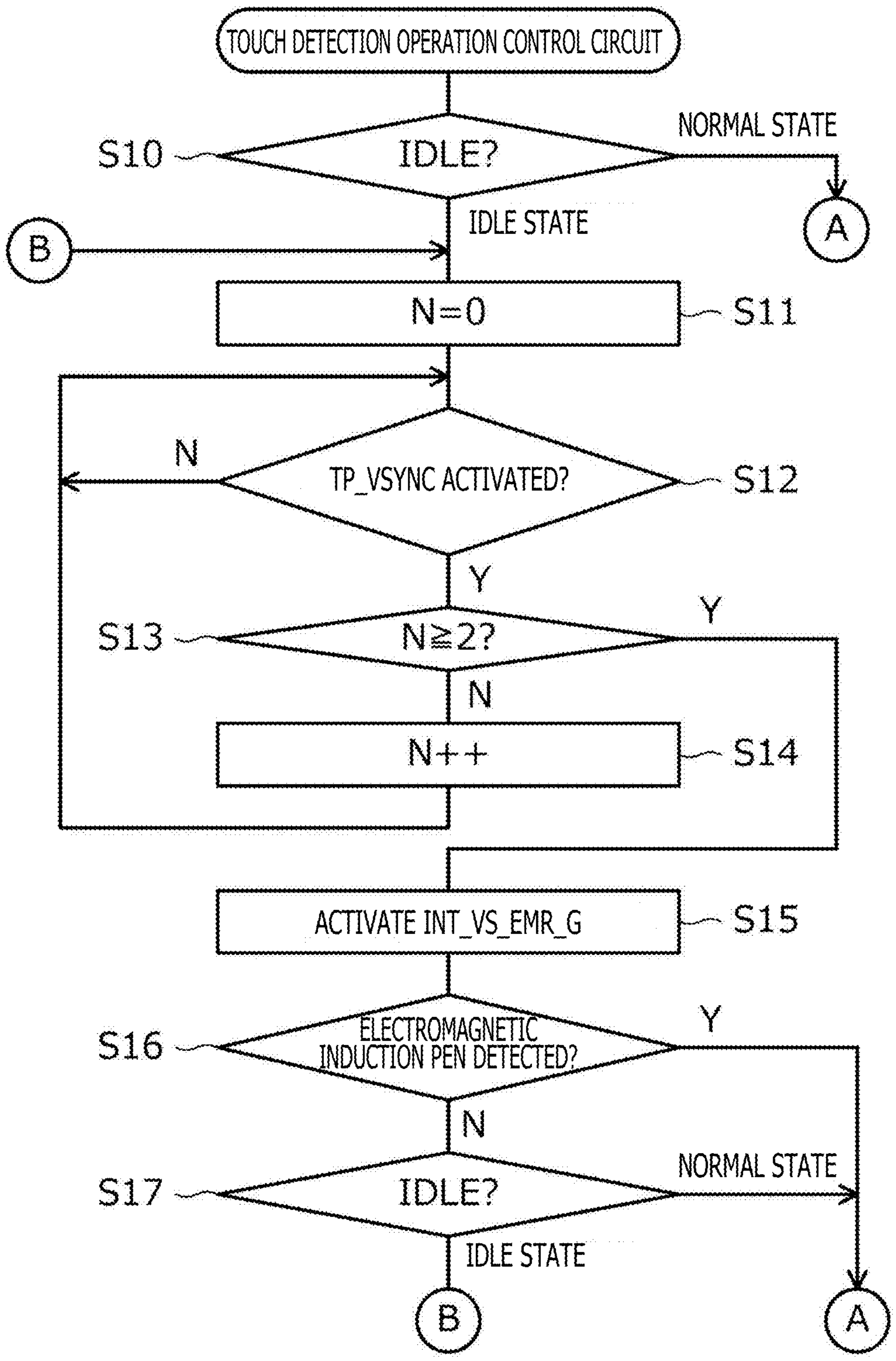
FIG. 5 is a flowchart illustrating processing of a pen detection operation control circuit according to the first embodiment of the present disclosure.
Figure 6:
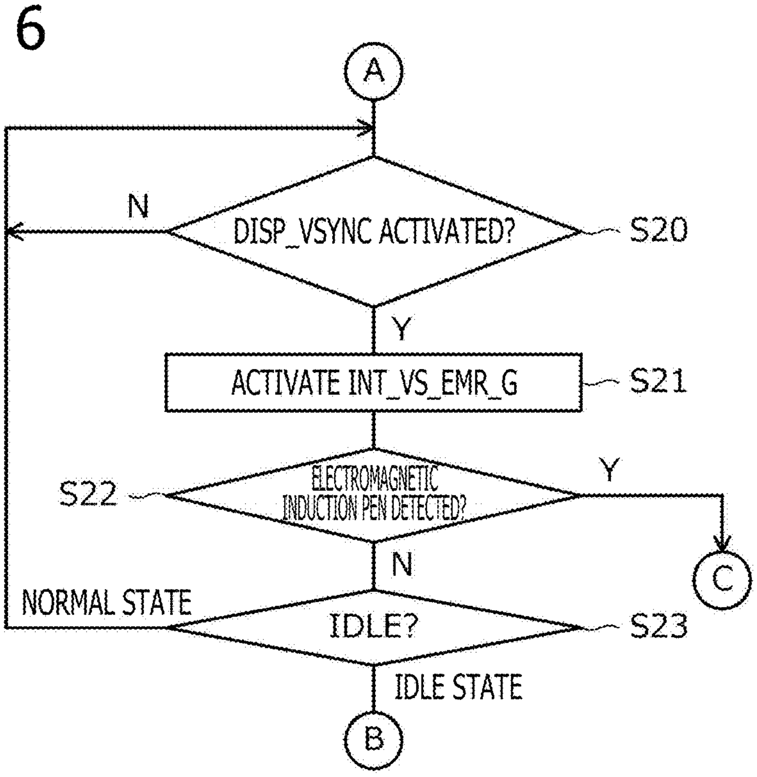
FIG. 6 is a flowchart illustrating the processing of the pen detection operation control circuit according to the first embodiment of the present disclosure.
Figure 7:
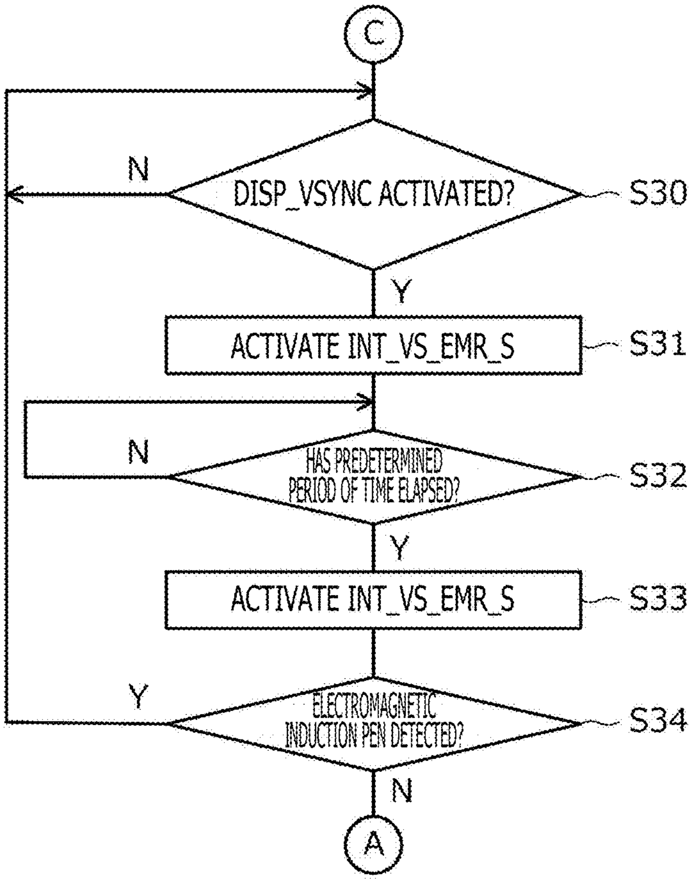
FIG. 7 is a flowchart illustrating the processing of the pen detection operation control circuit according to the first embodiment of the present disclosure.

FIG. 4 is a flowchart illustrating processing of the touch detection operation control circuit 20. FIGS. 5 to 7 are flowcharts illustrating processing of the pen detection operation control circuit 21. The operation of the sensor controller 30 will be described in detail again below with reference to these diagrams.

Described first with reference to FIG. 4, the touch detection operation control circuit 20 determines whether or not the pen detection circuit 23 is detecting the electromagnetic induction pen 2, by referring to the state flag PFLG stored by the pen detection circuit 23 (S1). When determining in this determination that the electromagnetic induction pen 2 is being detected, the touch detection operation control circuit 20 continues the determination processing of S1. In this case, the touch detection operation synchronization signal TP_VSYNC is not activated, and the touch detection operation by the touch detection circuit 22 is not executed.

Meanwhile, when determining at S1 that the electromagnetic induction pen 2 is not being detected, the touch detection operation control circuit 20 executes processing of activating the touch detection operation synchronization signal TP_VSYNC twice synchronously with the vertical synchronization signal DISP_VSYNC (S2 to S5).

Specifically, the touch detection operation control circuit 20 determines whether or not the vertical synchronization signal DISP_VSYNC has been activated (S2). The touch detection operation control circuit 20 repeats the processing of S2 when determining that the vertical synchronization signal DISP_VSYNC has not been activated, or activates the touch detection operation synchronization signal TP_VSYNC (S3) when determining that the vertical synchronization signal DISP_VSYNC has been activated. Thereafter, the touch detection operation control circuit 20 determines whether or not a predetermined period of time has elapsed (S4), and activates the touch detection operation synchronization signal TP_VSYNC again (S5) when determining that the predetermined period of time has elapsed.

After the end of S5, the touch detection operation control circuit 20 returns to S1 and repeats the above-described processing. Accordingly, the touch detection operation is executed twice in every frame cycle F illustrated in FIG. 3, on condition that the pen detection circuit 23 is not detecting the electromagnetic induction pen 2.

Described next with reference to FIG. 5, the pen detection operation control circuit 21 determines whether the host processor 31 is in the idle state or in the normal state, by referring to the state flag IDLE stored by the host processor 31 (S10). When determining in this determination that it is in the normal state, the pen detection operation control circuit 21 moves to S20 illustrated in FIG. 6 and continues the processing.

Meanwhile, the pen detection operation control circuit 21 that has determined that the host processor 31 is in the idle state at S10 executes processing of activating the pen detection operation synchronization signal INT_VS_EMR_G synchronously with the touch detection operation synchronization signal TP_VSYNC at a rate of one time in every three times of activation of the touch detection operation synchronization signal TP_VSYNC in order to cause the pen detection circuit 23 to operate in the idle scan mode (S11 to S15).

Specifically, first, the pen detection operation control circuit 21 sets 0 as a variable N that is a counter (S11), and repeatedly executes processing of determining whether or not the touch detection operation synchronization signal TP_VSYNC has been activated, until the touch detection operation synchronization signal TP_VSYNC is activated (S12). When determining in this determination that the touch detection operation synchronization signal TP_VSYNC has been activated, the pen detection operation control circuit 21 determines whether or not the variable N is equal to or larger than 2 (S13), and activates the pen detection operation synchronization signal INT_VS_EMR_G (S15) when the variable N is equal to or larger than 2. Meanwhile, when the variable N is not equal to or larger than 2, the pen detection operation control circuit 21 adds 1 to N (S14) and then returns to S12. When the pen detection operation synchronization signal INT_VS_EMR_G is activated at S15, the pen detection circuit 23 executes the global scan once.

The pen detection operation control circuit 21 that has activated the pen detection operation synchronization signal INT_VS_EMR_G at S15 determines whether or not the electromagnetic induction pen 2 has been detected (S16). The result of this determination becomes positive when the pen detection circuit 23 has detected the electromagnetic induction pen 2 by the global scan executed in response to the pen detection operation synchronization signal INT_VS_EMR_G activated at S15, and becomes negative in the other cases.

When the negative result is obtained at S16, the pen detection operation control circuit 21 determines again whether the host processor 31 is in the idle state or in the normal state, by referring to the state flag IDLE stored by the host processor 31 again (S17). The pen detection operation control circuit 21 that has obtained the positive result at S16 or obtained at S17 the determination result that the host processor 31 is in the normal state moves to S20 illustrated in FIG. 6 and continues the processing. Meanwhile, the pen detection operation control circuit 21 that has obtained at S17 the determination result that the host processor 31 is in the idle state returns to S11 and continues the processing.

Described next with reference to FIG. 6, the pen detection operation control circuit 21 that has made a transition to S20 executes processing of activating the pen detection operation synchronization signal INT_VS_EMR_G synchronously with the vertical synchronization signal DISP_VSYNC every time the vertical synchronization signal DISP_VSYNC is activated, in order to cause the pen detection circuit 23 to operate in the global scan mode (S20 to S23).

Specifically, the pen detection operation control circuit 21 repeatedly executes processing of determining whether or not the vertical synchronization signal DISP_VSYNC has been activated, until the vertical synchronization signal DISP_VSYNC is activated (S20). When determining in this determination that the vertical synchronization signal DISP_VSYNC has been activated, the pen detection operation control circuit 21 activates the pen detection operation synchronization signal INT_VS_EMR_G (S21). This activation causes the pen detection circuit 23 to execute the global scan once.

The pen detection operation control circuit 21 that has activated the pen detection operation synchronization signal INT_VS_EMR_G at S21 executes processing similar to S16 and S17 illustrated in FIG. 5 (S22 and S23). That is, the pen detection operation control circuit 21 determines whether or not the electromagnetic induction pen 2 has been detected as the result of the activation at S21 (S22), and, when obtaining the negative result, determines whether the host processor 31 is in the idle state or in the normal state, by referring to the state flag IDLE stored by the host processor 31 (S23).

The pen detection operation control circuit 21 that has obtained the positive result at S22 moves to S30 in FIG. 7 and continues the processing. Further, when obtaining the determination result that the host processor 31 is in the normal state, at S23 executed in response to the negative result at S22, the pen detection operation control circuit 21 returns to S20 and continues the processing. When obtaining the determination result that the host processor 31 is in the idle state, the pen detection operation control circuit 21 moves to S11 in FIG. 5 and continues the processing.

Described next with reference to FIG. 7, the pen detection operation control circuit 21 that has made a transition to S30 executes processing of activating the pen detection operation synchronization signal INT_VS_EMR_S twice synchronously with the vertical synchronization signal DISP_VSYNC every time the vertical synchronization signal DISP_VSYNC is activated, in order to cause the pen detection circuit 23 to operate in the sector scan mode (S30 to S33).

Specifically, the pen detection operation control circuit 21 determines whether or not the vertical synchronization signal DISP_VSYNC has been activated (S30). The pen detection operation control circuit 21 repeats the processing of S30 when determining that the vertical synchronization signal DISP_VSYNC has not been activated, or activates the pen detection operation synchronization signal INT_VS_EMR_S (S31) when determining that the vertical synchronization signal DISP_VSYNC has been activated. Thereafter, the pen detection operation control circuit 21 determines whether or not a predetermined period of time has elapsed (S32), and activates the pen detection operation synchronization signal INT_VS_EMR_S again (S33) when determining that the predetermined period of time has elapsed.

After the end of S33, the pen detection operation control circuit 21 determines whether or not the electromagnetic induction pen 2 has been detected as the result of the activation at S31 or S33 (S34). When obtaining the negative result, the pen detection operation control circuit 21 moves to S20 and causes the pen detection circuit 23 to execute the global scan. On the other hand, when obtaining the positive result at S34, the pen detection operation control circuit 21 returns to S30 and repeats the above-described processing. Accordingly, the sector scan is executed twice in every frame cycle F illustrated in FIG. 3 while the pen detection circuit 23 is detecting the electromagnetic induction pen 2.

As described above, according to the sensor controller 30 in accordance with the present embodiment, before the electromagnetic induction pen 2 is detected, the touch detection operation is executed synchronously with the pixel driving of the display 42. In addition, the pen detection operation is executed synchronously with the touch detection operation. On the other hand, when the touch detection operation has stopped in response to detection of the electromagnetic induction pen 2, the pen detection operation is executed synchronously with the pixel driving of the display 42. Therefore, it becomes possible to suppress, without fail, interference between the signal used for the pen detection operation and the signal used for the pixel driving of the display 42.

Next, the position detection system 1 according to a second embodiment of the present disclosure will be described. The position detection system 1 according to the present embodiment is different from the position detection system 1 according to the first embodiment in internal processing of the sensor controller 30, and but similar to the position detection system 1 according to the first embodiment in the other points. Description will be given below with focus on the difference from the position detection system 1 according to the first embodiment.

Figure 8:
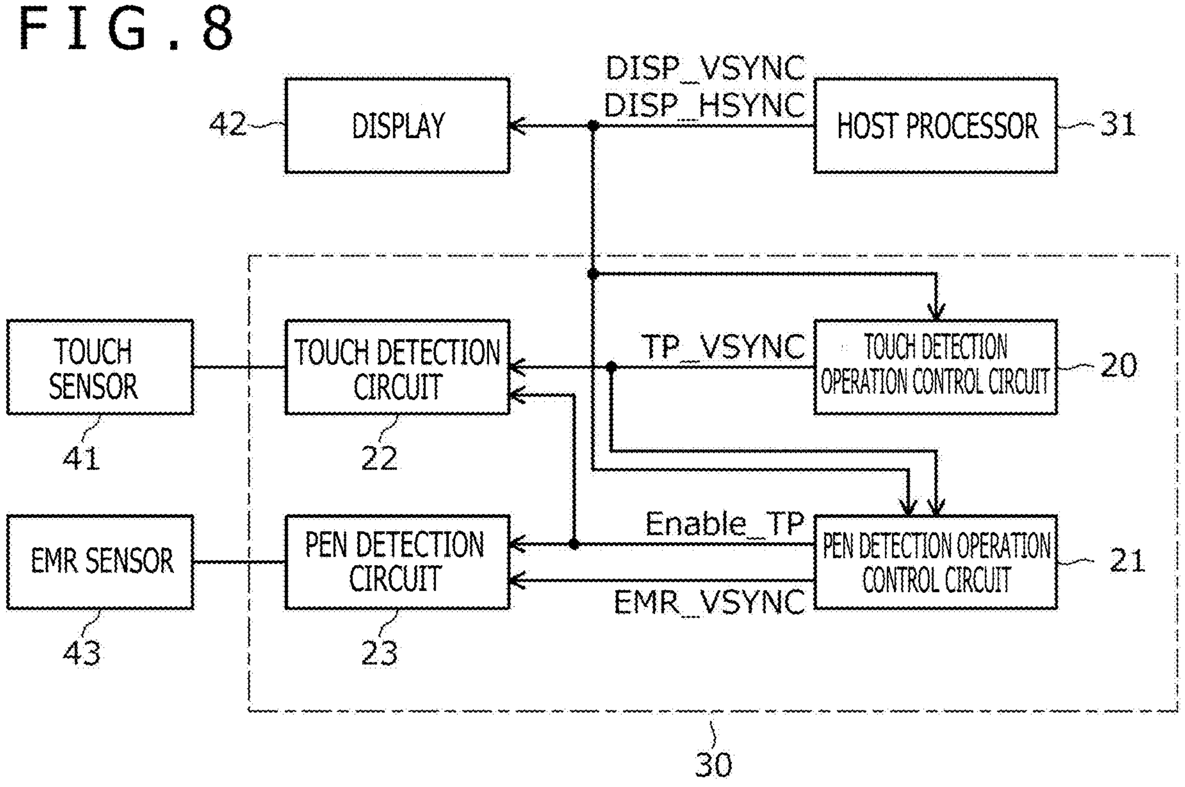
FIG. 8 is a diagram illustrating an internal configuration of the sensor controller according to a second embodiment of the present disclosure.

FIG. 8 is a diagram illustrating an internal configuration of the sensor controller 30 according to the present embodiment. As is understood from the comparison between this diagram and FIG. 2, the pen detection operation control circuit 21 according to the present embodiment is configured to generate a pen detection operation synchronization signal EMR_VSYNC and a touch detection enable signal Enable_TP instead of the pen detection operation synchronization signals INT_VS_EMR_G and INT_VS_EMR_S, supply both of them to the pen detection circuit 23, and supply only the touch detection enable signal Enable_TP to the touch detection circuit 22. Note that the state flags IDLE and PFLG are not used in the present embodiment.

The pen detection circuit 23 according to the present embodiment is configured to execute one time of the global scan every time the pen detection operation synchronization signal EMR_VSYNC is activated, in the case in which the touch detection enable signal Enable_TP is activated, and execute one time of the sector scan every time the pen detection operation synchronization signal EMR_VSYNC is activated, in the case in which the touch detection enable signal Enable_TP is deactivated. The idle scan is not used in the present embodiment.

The touch detection operation control circuit 20 according to the present embodiment is configured to generate the touch detection operation synchronization signal TP_VSYNC synchronously with the vertical synchronization signal DISP_VSYNC irrespective of whether or not the electromagnetic induction pen 2 has been detected by the pen detection circuit 23. Meanwhile, the touch detection circuit 22 according to the present embodiment is configured to execute the touch detection operation in response to activation of the touch detection operation synchronization signal TP_VSYNC in the case in which the touch detection enable signal Enable_TP is activated, and be kept from executing the touch detection operation irrespective of the state of the touch detection operation synchronization signal TP_VSYNC in the case in which the touch detection enable signal Enable_TP is deactivated.

Figure 9:
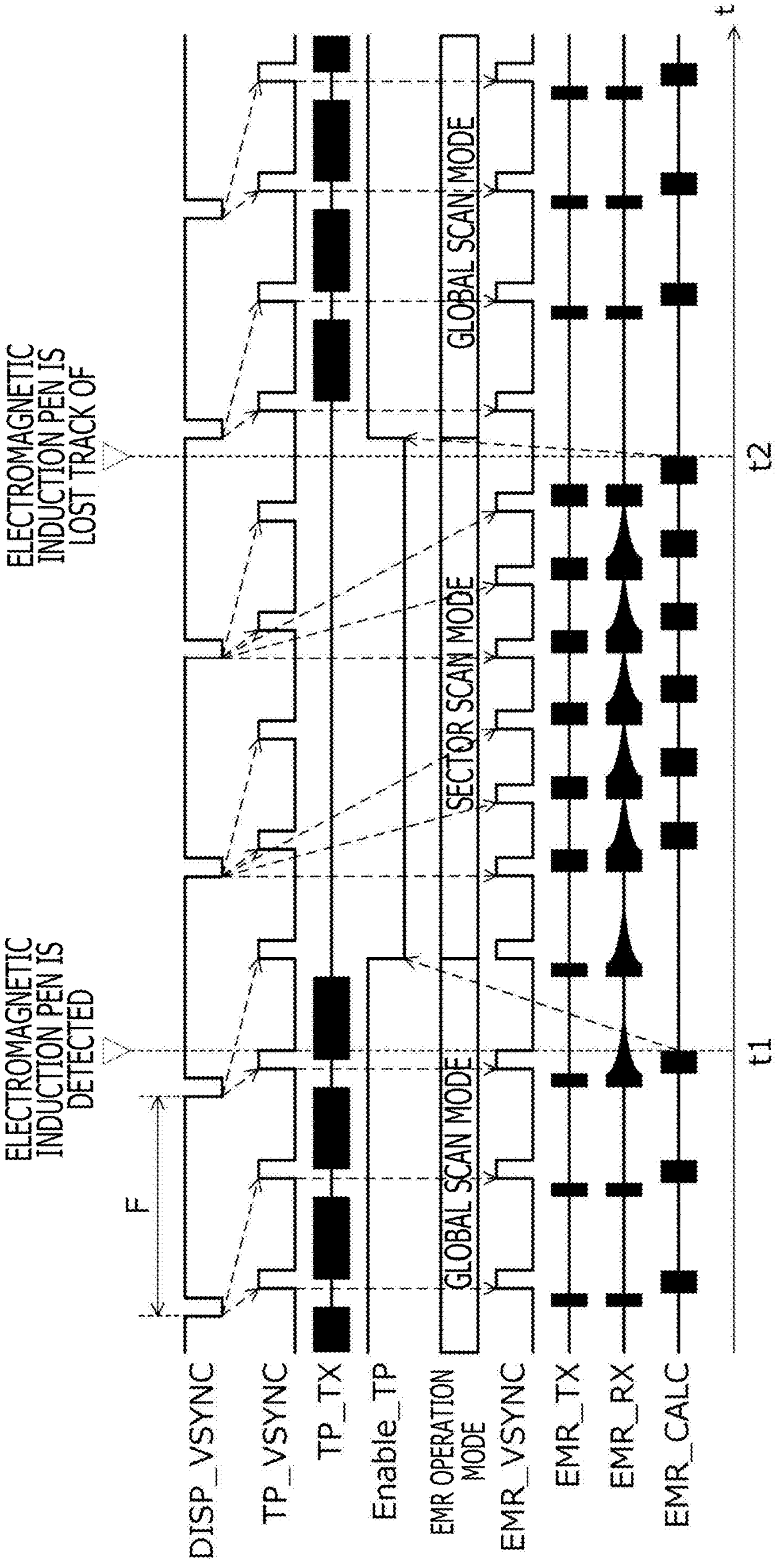
FIG. 9 is a time chart illustrating the signals as well as operation and operation modes of the sensor controller according to the second embodiment of the present disclosure.

FIG. 9 is a time chart illustrating the signals as well as operation and operation modes of the sensor controller 30 according to the present embodiment. A touch detection signal TP_TX illustrated in FIG. 9 is a signal transmitted by the touch detection circuit 22 to each of the plurality of first linear electrodes in the touch sensor 41 in order to derive the position of a passive pointer. Black-painted areas illustrated in FIG. 9 represent that the touch detection signal TP_TX is being transmitted. Moreover, an EMR transmission signal EMR_TX is an AC current supplied by the pen detection circuit 23 to one of the plurality of first loop coils in the EMR sensor 43. Black-painted areas illustrated in FIG. 9 represent that the EMR transmission signal EMR_TX is currently being supplied. An EMR reception signal EMR_RX indicates, as a representative, the AC current with the highest detection intensity among AC currents each detected by the pen detection circuit 23 in a respective one of the plurality of second loop coils in the EMR sensor 43. Black-painted areas illustrated in FIG. 9 represent the detection intensity of the EMR reception signal EMR_RX. An EMR position derivation processing state EMR_CALC indicates the state of derivation of the position of the electromagnetic induction pen 2 by the pen detection circuit 23. Black-painted areas illustrated in FIG. 9 represent that this derivation is currently being executed. These points are the same also in FIG. 14 to be given later.

As illustrated in FIG. 9, the pen detection operation control circuit 21 according to the present embodiment is configured to deactivate the touch detection enable signal Enable_TP in response to detection of the electromagnetic induction pen 2 at a time t1 and return the touch detection enable signal Enable_TP to the activated state in response to an event that the electromagnetic induction pen 2 becomes undetected (that is, the electromagnetic induction pen 2 is lost track of) at a time t2. Further, the pen detection operation control circuit 21 is configured to activate the pen detection operation synchronization signal EMR_VSYNC synchronously with the touch detection operation synchronization signal TP_VSYNC generated by the touch detection operation control circuit 20 in principle and activate the pen detection operation synchronization signal EMR_VSYNC three times every time the vertical synchronization signal DISP_VSYNC generated by the host processor 31 is activated while the electromagnetic induction pen 2 has been detected (period between the time t1 and the time 2 in FIG. 9). Accordingly, the pen detection circuit 23 executes the pen detection operation (specifically, the global scan) synchronously with the touch detection operation when the electromagnetic induction pen 2 has not been detected. Meanwhile, when the electromagnetic induction pen 2 has been detected by this pen detection operation, the pen detection circuit 23 executes three times of the pen detection operation (specifically, the sector scan) synchronously with the pixel driving of the display 42 every time the vertical synchronization signal DISP_VSYNC is activated. Note that the pen detection circuit 23 may execute one time of the sector scan in such a manner that the one time of the sector scan is distributed into these three times of the pen detection operation. Moreover, the touch detection circuit 22 executes the touch detection operation synchronously with the pixel driving of the display 42 when the electromagnetic induction pen 2 has not been detected by the pen detection circuit 23, but does not execute the touch detection operation when the electromagnetic induction pen 2 has been detected by the pen detection circuit 23.

In the present embodiment, unlike in the first embodiment, the generation of the touch detection operation synchronization signal TP_VSYNC by the touch detection operation control circuit 20 is not stopped even when the electromagnetic induction pen 2 has been detected by the pen detection circuit 23. The reason why, in spite of that, the pen detection operation control circuit 21 executes the above-described operation is as follows. When the touch detection operation is executed, it is required to execute the pen detection operation in direct synchronization with the touch detection operation in order to keep the touch detection operation and the pen detection operation from mutually acting as noise. Meanwhile, when the touch detection operation is not executed, such a need does not exist, and it becomes preferable to execute the pen detection operation in direct synchronization with the pixel driving of the display 42 in order to keep the pixel driving and the pen detection operation from mutually acting as noise.

Figure 10:
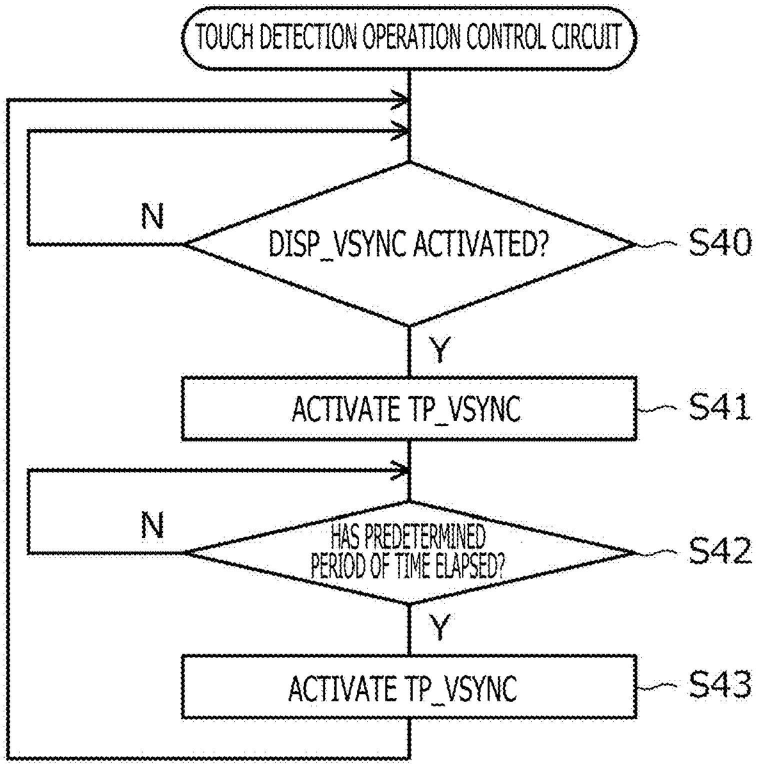
FIG. 10 is a flowchart illustrating processing of the touch detection operation control circuit according to the second embodiment of the present disclosure.
Figure 11:
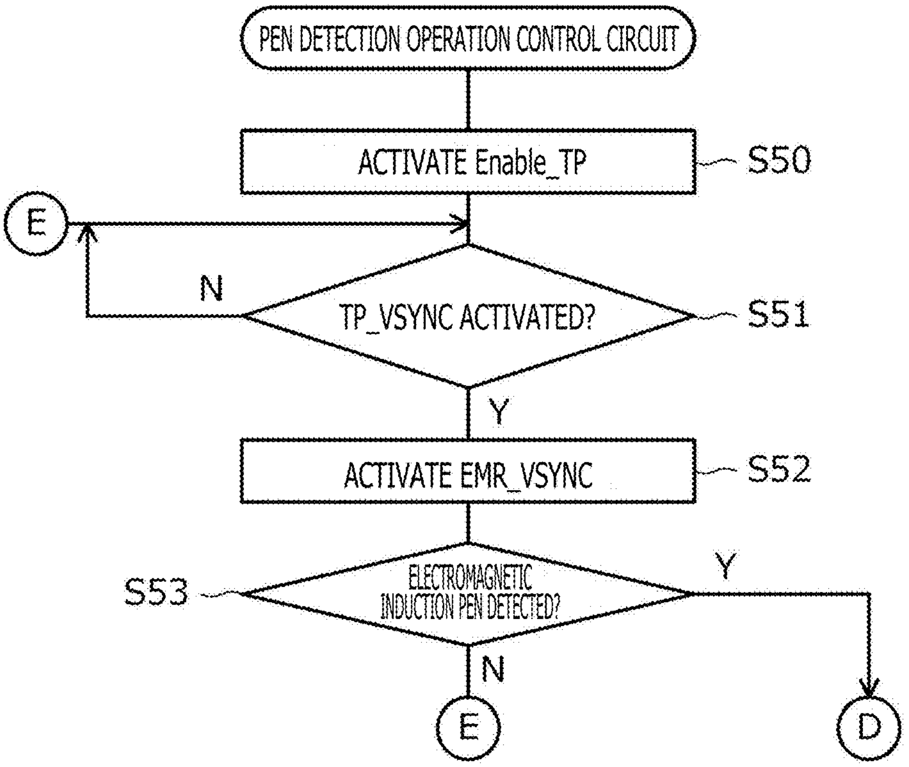
FIG. 11 is a flowchart illustrating processing of the pen detection operation control circuit according to the second embodiment of the present disclosure.
Figure 12:
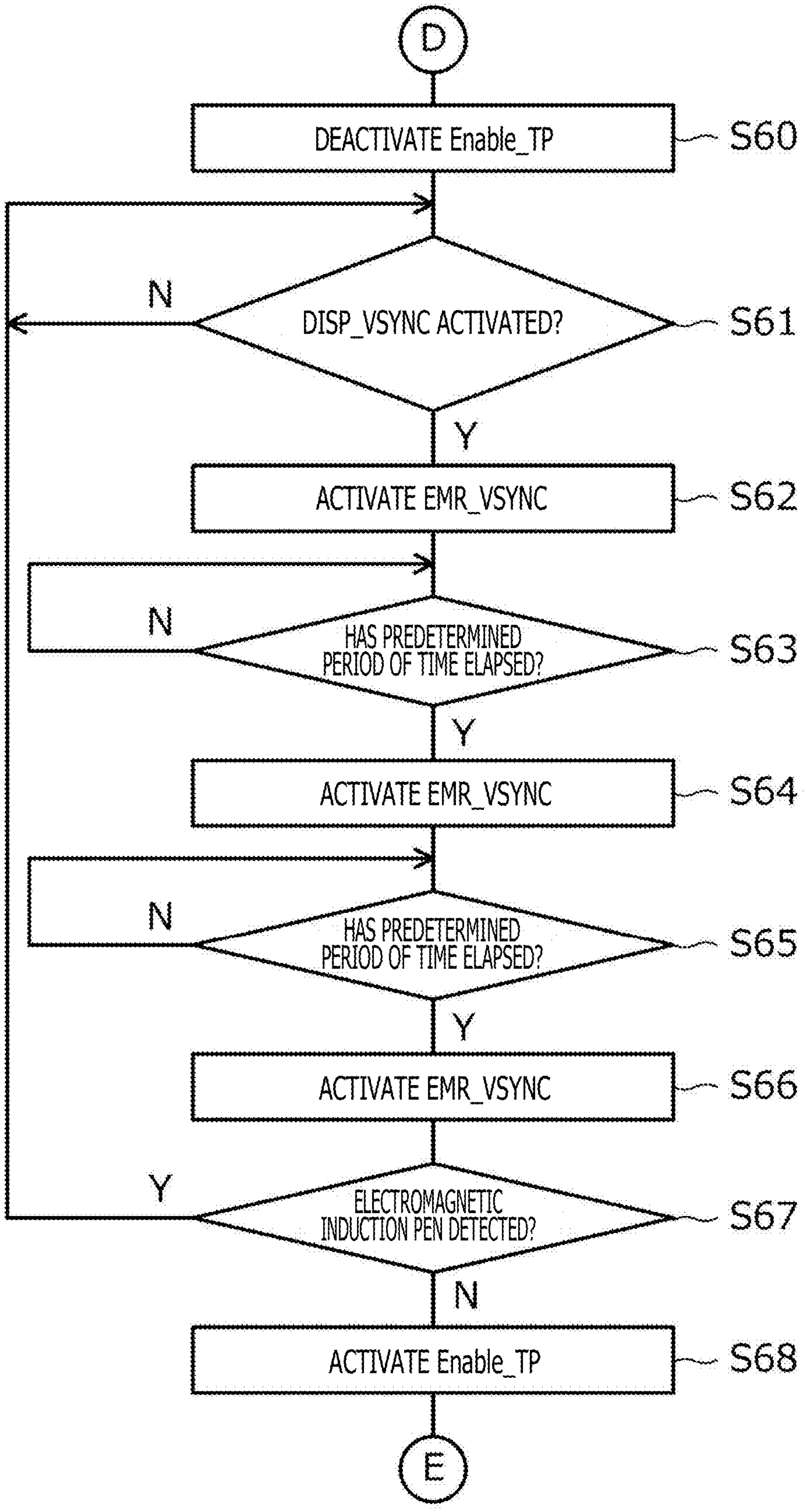
FIG. 12 is a flowchart illustrating the processing of the pen detection operation control circuit according to the second embodiment of the present disclosure.

FIG. 10 is a flowchart illustrating processing of the touch detection operation control circuit 20 according to the present embodiment. FIGS. 11 and 12 are flowcharts illustrating processing of the pen detection operation control circuit 21 according to the present embodiment. The operation of the sensor controller 30 according to the present embodiment will be described in detail again below with reference to these diagrams.

Described first with reference to FIG. 10, the operation of the touch detection operation control circuit 20 according to the present embodiment is the same as the operation of the touch detection operation control circuit 20 according to the first embodiment illustrated in FIG. 4, except that the determination processing for the state flag PFLG is not performed (S40 to S43). Therefore, according to the touch detection operation control circuit 20 in accordance with the present embodiment, an instruction to execute the touch detection operation is supplied to the touch detection circuit 22 twice in every frame cycle F illustrated in FIG. 9 irrespective of whether or not the pen detection circuit 23 is detecting the electromagnetic induction pen 2. However, as described above, the touch detection circuit 22 according to the present embodiment does not execute the touch detection operation when the touch detection enable signal Enable_TP is deactivated. Thus, eventually, the touch detection operation is not executed when the pen detection circuit 23 is detecting the electromagnetic induction pen 2.

Described next with reference to FIG. 11, the pen detection operation control circuit 21 according to the present embodiment first activates the touch detection enable signal Enable_TP (S50) to make the state in which the touch detection operation is executed by the touch detection circuit 22 and cause the pen detection circuit 23 to enter the global scan mode. Subsequently, the pen detection operation control circuit 21 repeatedly executes processing of determining whether or not the touch detection operation synchronization signal TP_VSYNC has been activated, until the touch detection operation synchronization signal TP_VSYNC is activated (S51), and activates the pen detection operation synchronization signal EMR_VSYNC (S52) in response to determining that the touch detection operation synchronization signal TP_VSYNC has been activated. Thereafter, the pen detection operation control circuit 21 determines whether or not the electromagnetic induction pen 2 has been detected by the pen detection circuit 23 (S53). The pen detection operation control circuit 21 returns to S51 when determining that it has not been detected, or moves the processing to S60 in FIG. 12 when determining that it has been detected.

Described next with reference to FIG. 12, the pen detection operation control circuit 21 that has made a transition to S60 deactivates the touch detection enable signal Enable_TP (S60) to make the state in which the touch detection operation is not executed by the touch detection circuit 22 and cause the pen detection circuit 23 to enter the sector scan mode. Subsequently, the pen detection operation control circuit 21 determines whether or not the vertical synchronization signal DISP_VSYNC has been activated (S61). The pen detection operation control circuit 21 repeats the processing of S61 when determining that the vertical synchronization signal DISP_VSYNC has not been activated, or activates the pen detection operation synchronization signal EMR_VSYNC (S62) when determining that the vertical synchronization signal DISP_VSYNC has been activated. Thereafter, the pen detection operation control circuit 21 determines whether or not a predetermined period of time has elapsed (S63), and activates the pen detection operation synchronization signal EMR_VSYNC again (S64) when determining that the predetermined period of time has elapsed. Then, the pen detection operation control circuit 21 further determines whether or not the predetermined period of time has elapsed (S65), and executes the third round of the activation of the pen detection operation synchronization signal EMR_VSYNC (S66) when determining that the predetermined period of time has elapsed. Accordingly, the detection operation for the electromagnetic induction pen 2 by the pen detection circuit 23 is executed three times every time the vertical synchronization signal DISP_VSYNC is activated.

After the end of S66, the pen detection operation control circuit 21 determines whether or not the electromagnetic induction pen 2 has been detected as the result of the activation at S62, S64, or S66 (S67). When obtaining the negative result, the pen detection operation control circuit 21 activates the touch detection enable signal Enable_TP (S68) and moves the processing to S51 in FIG. 11. Meanwhile, when obtaining the positive result at S67, the pen detection operation control circuit 21 returns to S61 and repeats the above-described processing.

As described above, according to the sensor controller 30 in accordance with the present embodiment, before the electromagnetic induction pen 2 is detected, the touch detection operation is executed synchronously with the pixel driving of the display 42. In addition, the pen detection operation is executed synchronously with the touch detection operation. On the other hand, when the touch detection operation has stopped in response to detection of the electromagnetic induction pen 2, the pen detection operation is executed synchronously with the pixel driving of the display 42 although the generation of the touch detection operation synchronization signal TP_VSYNC by the touch detection operation control circuit 20 has not stopped. Therefore, it becomes possible to suppress, without fail, interference between the signal used for the pen detection operation and the signal used for the pixel driving of the display 42.

Next, the position detection system 1 according to a third embodiment of the present disclosure will be described. The position detection system 1 according to the present embodiment is different from the position detection system 1 according to the second embodiment in that a pen detection operation synchronization signal EMR_HSYNC that synchronizes with the horizontal synchronization signal DISP_HSYNC is used, but is similar to the position detection system 1 according to the second embodiment in the other points. Description will be given below with focus on the difference from the position detection system 1 according to the second embodiment.

Figure 13:
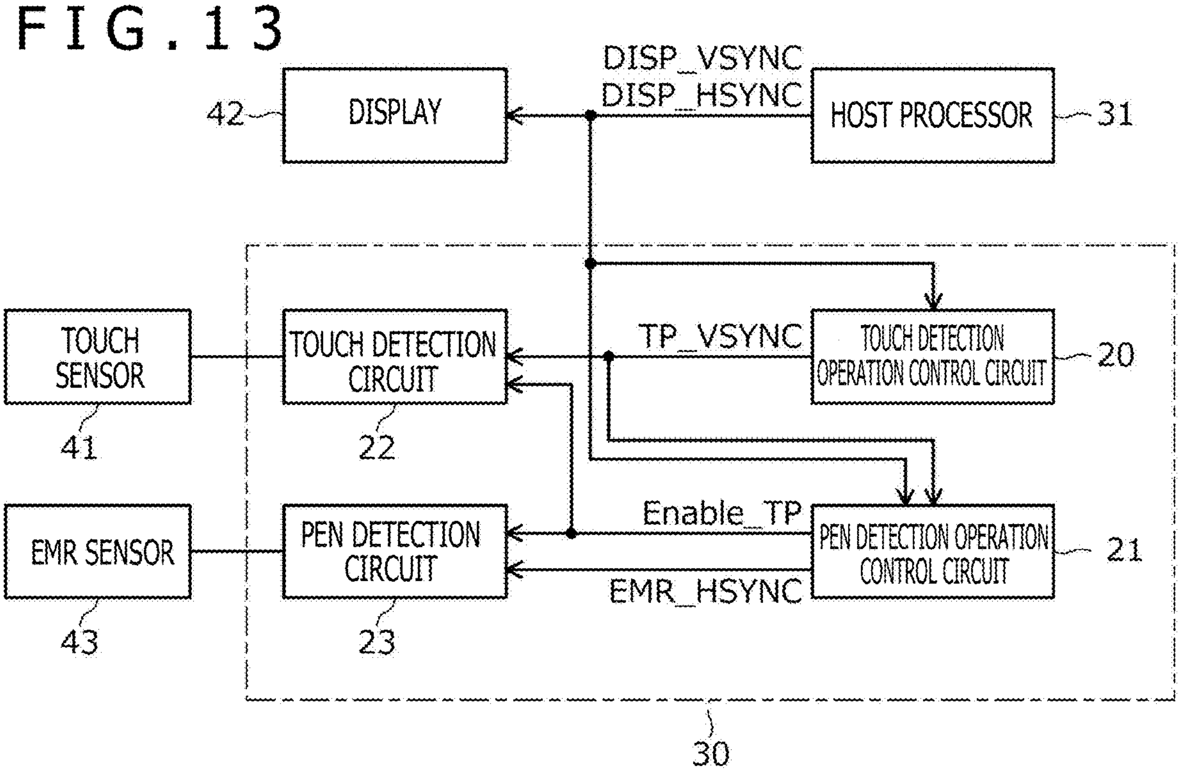
FIG. 13 is a diagram illustrating an internal configuration of the sensor controller according to a third embodiment of the present disclosure.

FIG. 13 is a diagram illustrating an internal configuration of the sensor controller 30 according to the present embodiment. As is understood from the comparison between this diagram and FIG. 8, the pen detection operation control circuit 21 according to the present embodiment is configured to supply the pen detection operation synchronization signal EMR_HSYNC to the pen detection circuit 23, instead of the pen detection operation synchronization signal EMR_VSYNC. In the present embodiment, the pen detection operation synchronization signal EMR_VSYNC is used only as an internal signal of the pen detection operation control circuit 21 and is not supplied to the pen detection circuit 23.

The pen detection circuit 23 according to the present embodiment is configured to execute one time of the global scan every time the pen detection operation synchronization signal EMR_HSYNC is activated, in the case in which the touch detection enable signal Enable_TP is activated, and execute one time of the sector scan every time the pen detection operation synchronization signal EMR_HSYNC is activated, in the case in which the touch detection enable signal Enable_TP is deactivated.

Figure 14:
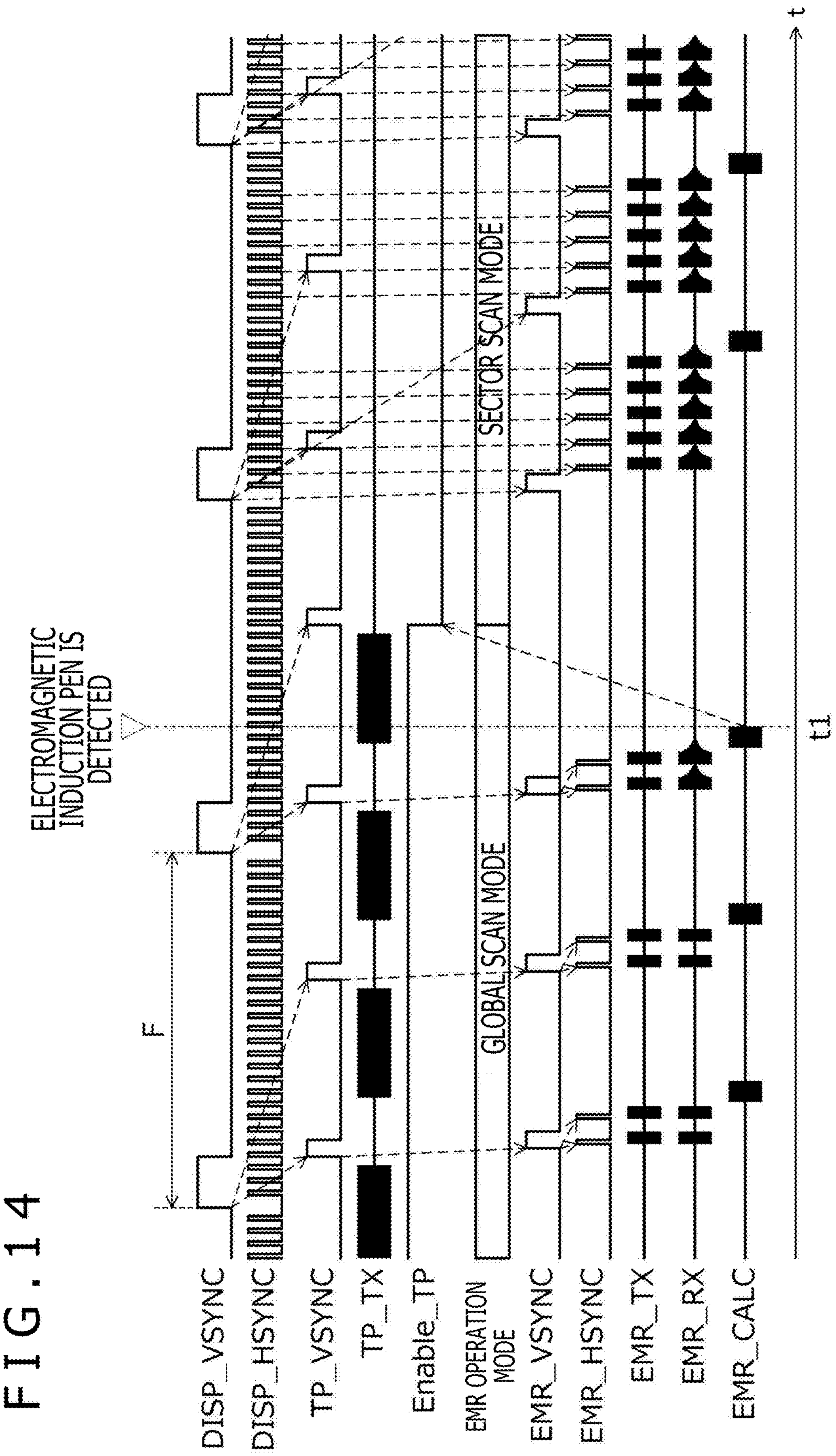
FIG. 14 is a time chart illustrating the signals as well as operation and operation modes of the sensor controller according to the third embodiment of the present disclosure.

FIG. 14 is a time chart illustrating the signals as well as operation and operation modes of the sensor controller 30 according to the present embodiment. As illustrated in this diagram, the pen detection operation control circuit 21 according to the present embodiment is configured to, when the electromagnetic induction pen 2 has not been detected, activate the pen detection operation synchronization signal EMR_HSYNC twice every time the pen detection operation synchronization signal EMR_VSYNC that synchronizes with the touch detection operation synchronization signal TP_VSYNC is activated. Moreover, the pen detection operation control circuit 21 is configured to, when the electromagnetic induction pen 2 has been detected, activate the pen detection operation synchronization signal EMR_HSYNC five times at timings that synchronize with the horizontal synchronization signal DISP_HSYNC, every time the pen detection operation synchronization signal EMR_VSYNC that synchronizes with the vertical synchronization signal DISP_VSYNC is activated. Accordingly, the pen detection circuit 23 executes two times of the pen detection operation (specifically, the global scan) every time the touch detection operation synchronization signal TP_VSYNC is activated, when the electromagnetic induction pen 2 has not been detected. Meanwhile, when the electromagnetic induction pen 2 has been detected by this pen detection operation, the pen detection circuit 23 executes ten times of the pen detection operation (specifically, the sector scan) synchronously with the pen detection operation synchronization signal EMR_HSYNC every time the vertical synchronization signal DISP_VSYNC is activated. Note that the pen detection circuit 23 may execute one time of the global scan in such a manner that the one time of the global scan is distributed into the above-described two times of the pen detection operation and may execute one time of the global scan in such a manner that the one time of the global scan is distributed into the above-described ten times of the pen detection operation (or five times of the pen detection operation executed in response to one time of activation of the pen detection operation synchronization signal EMR_VSYNC).

Figure 15:
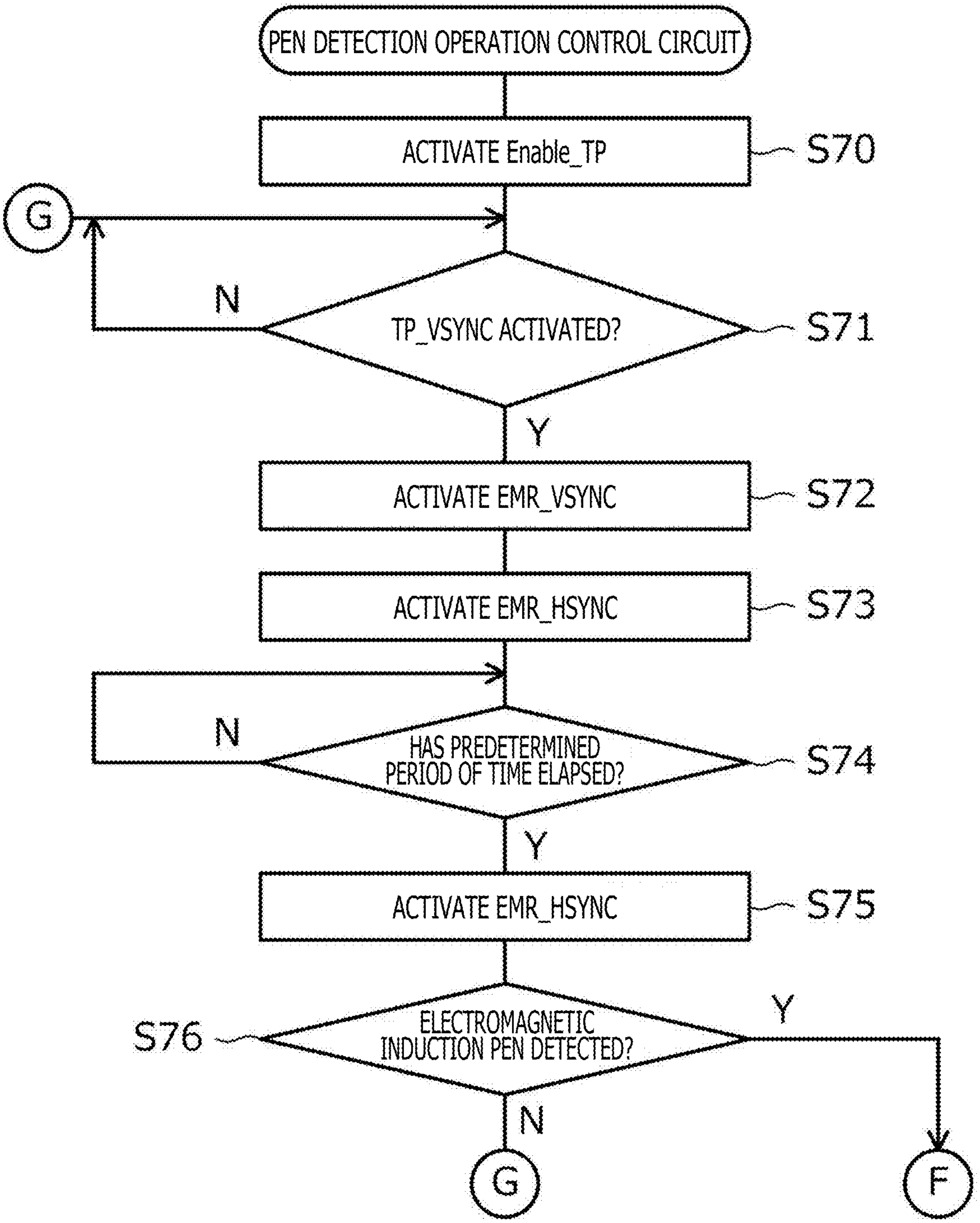
FIG. 15 is a flowchart illustrating processing of the pen detection operation control circuit according to the third embodiment of the present disclosure.
Figure 16:
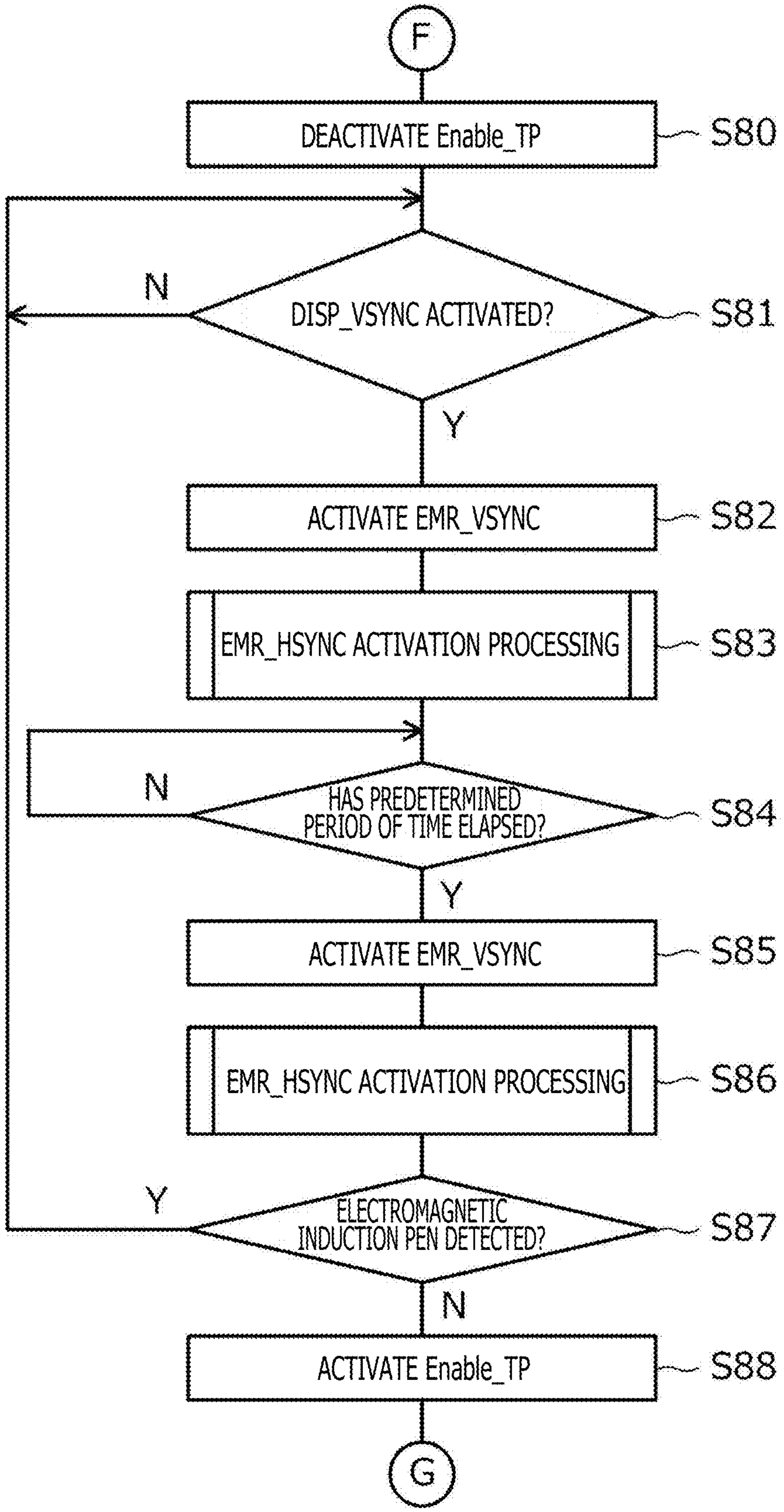
FIG. 16 is a flowchart illustrating the processing of the pen detection operation control circuit according to the third embodiment of the present disclosure.
Figure 17:
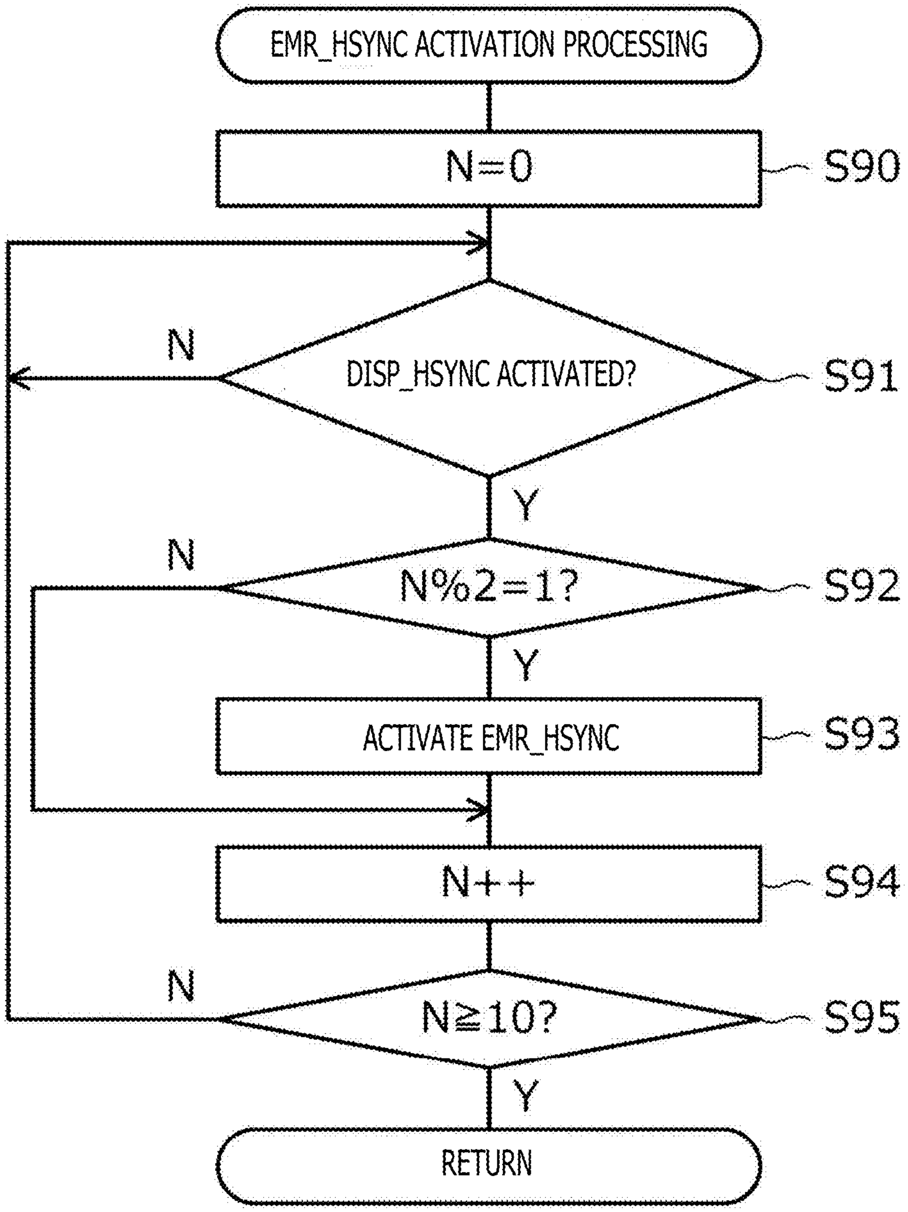
FIG. 17 is a flowchart illustrating the specific contents of EMR_HSYNC activation processing illustrated in FIG. 16.

FIGS. 15 and 16 are flowcharts illustrating processing of the pen detection operation control circuit 21 according to the present embodiment. Further, FIG. 17 is a flowchart illustrating the specific contents of EMR_HSYNC activation processing illustrated in FIG. 16. The operation of the sensor controller 30 according to the present embodiment will be described in detail again below with reference to these diagrams.

Described first with reference to FIGS. 15, S70 to S72 in the operation of the pen detection operation control circuit 21 according to the present embodiment are similar to S50 to S52 performed by the pen detection operation control circuit 21 according to the second embodiment illustrated in FIG. 11. After activating the pen detection operation synchronization signal EMR_VSYNC at S72, the pen detection operation control circuit 21 according to the present embodiment activates the pen detection operation synchronization signal EMR_HSYNC (S73), waits for a predetermined period of time (S74), and then activates the pen detection operation synchronization signal EMR_HSYNC again (S75). Thereafter, the pen detection operation control circuit 21 determines whether or not the electromagnetic induction pen 2 has been detected by the pen detection circuit 23 as the result of the activation at S73 or S75 (S76). The pen detection operation control circuit 21 returns to S71 when determining that it has not been detected, or moves the processing to S80 in FIG. 16 when determining that it has been detected.

Described next with reference to FIG. 16, a series of processing illustrated in FIG. 16 (S80 to S88) is similar to the series of processing illustrated in FIG. 12 (S60 to S68) except that the number of times of activation of the pen detection operation synchronization signal EMR_VSYNC executed in response to one time of activation of the vertical synchronization signal DISP_VSYNC is only two and except that the EMR_HSYNC activation processing (S83 and S86) is executed after the pen detection operation synchronization signal EMR_VSYNC is activated.

The EMR_HSYNC activation processing executed at S83 and S86 will be described with reference to FIG. 17. First, the pen detection operation control circuit 21 sets 0 as a variable N that is a counter (S90), and repeatedly executes processing of determining whether or not the horizontal synchronization signal DISP_HSYNC has been activated, until the horizontal synchronization signal DISP_HSYNC is activated (S91). When determining in this determination that the horizontal synchronization signal DISP_HSYNC has been activated, the pen detection operation control circuit 21 determines whether or not the remainder obtained when the variable N is divided by 2 is 1 (S92). Then, the pen detection operation control circuit 21 activates the pen detection operation synchronization signal EMR_HSYNC (S93) when determining that the remainder is 1, or advances the processing to S94 without activating the pen detection operation synchronization signal EMR_HSYNC when determining that the remainder is 0.

The pen detection operation control circuit 21 adds 1 to N at S94, and subsequently determines whether or not N is equal to or larger than 10 (S95). Then, the pen detection operation control circuit 21 returns to S91 and continues the processing when determining that N is not equal to or larger than 10, or ends the EMR_HSYNC activation processing when determining that N is equal to or larger than 10. By the above-described processing, the pen detection operation control circuit 21 activates the pen detection operation synchronization signal EMR_HSYNC five times every time the pen detection operation synchronization signal EMR_VSYNC is activated. Moreover, the pen detection operation synchronization signal EMR_HSYNC is activated when activation of the horizontal synchronization signal DISP_HSYNC is the even-numbered round of activation as counted from the most recent activation of the pen detection operation synchronization signal EMR_VSYNC.

As described above, also according to the sensor controller 30 in accordance with the present embodiment, before the electromagnetic induction pen 2 is detected, the touch detection operation is executed synchronously with the pixel driving of the display 42. In addition, the pen detection operation is executed synchronously with the touch detection operation. On the other hand, when the touch detection operation has stopped in response to detection of the electromagnetic induction pen 2, the pen detection operation is executed synchronously with the pixel driving of the display 42 although the generation of the touch detection operation synchronization signal TP_VSYNC by the touch detection operation control circuit 20 has not stopped. Therefore, it becomes possible to suppress, without fail, interference between the signal used for the pen detection operation and the signal used for the pixel driving of the display 42.

Although the preferred embodiments of the present disclosure have been described above, it is obvious that the present disclosure is not limited to such embodiments at all and can be carried out in various modes without departing from the gist thereof.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method executed by a sensor controller connected to an electro-magnetic resonance sensor disposed to overlap with a display, the method comprising:

executing a first operation for detecting, by using the electro-magnetic resonance sensor, an electromagnetic induction pen synchronously with a touch detection operation for detecting a touch made by a passive pointer in a panel surface of the display;

executing a second operation for detecting, by using the electro-magnetic resonance sensor, the electromagnetic induction pen synchronously with pixel driving of the display when the electromagnetic induction pen is detected; and not executing the touch detection operation when the electromagnetic induction pen is detected, wherein the first operation that is executed synchronously with the touch detection operation and is for detecting the electromagnetic induction pen is executed with lower power than the second operation that is executed synchronously with the pixel driving of the display and is for detecting the electromagnetic induction pen.

2. A position detection device comprising:

a display;

an electro-magnetic resonance sensor and a touch sensor disposed to overlap with the display; and a sensor controller connected to each of the electro-magnetic resonance sensor and the touch sensor, wherein the sensor controller, in operation, executes a first operation for detecting, by using the electro-magnetic resonance sensor, an electromagnetic induction pen synchronously with a touch detection operation executed by use of the touch sensor for detecting a touch made by a passive pointer in a panel surface of the display, executes a second operation for detecting, by using the electro-magnetic resonance sensor, the electromagnetic induction pen synchronously with pixel driving of the display when the electromagnetic induction pen is detected, and does not execute the touch detection operation when the electromagnetic induction pen is detected, wherein the first operation that is executed synchronously with the touch detection operation and is for detecting the electromagnetic induction pen is executed with lower power than the second operation that is executed synchronously with the pixel driving of the display and is for detecting the electromagnetic induction pen.

3. A sensor controller connected to an electro-magnetic resonance sensor disposed to overlap with a display, the sensor controller comprising:

a processor; and a memory storing a program that, when executed by the processor, causes the sensor controller to:

execute a first operation for detecting, by using the electro-magnetic resonance sensor, an electromagnetic induction pen synchronously with a touch detection operation for detecting a touch made by a passive pointer in a panel surface of the display, execute a second operation for detecting, by using the electro-magnetic resonance sensor, the electromagnetic induction pen synchronously with pixel driving of the display when the electromagnetic induction pen is detected, and not execute the touch detection operation when the electromagnetic induction pen is detected, wherein the first operation that is executed synchronously with the touch detection operation and is for detecting the electromagnetic induction pen is executed with lower power than the second operation that is executed synchronously with the pixel driving of the display and is for detecting the electromagnetic induction pen.

4. The sensor controller according to claim 3, wherein the touch detection operation is executed by use of a touch sensor disposed to overlap with the display, and the touch detection operation is stopped when the electromagnetic induction pen is detected.

5. The sensor controller according to claim 3, wherein the first operation that is executed synchronously with the touch detection operation and is for detecting the electromagnetic induction pen and the second operation that is executed synchronously with the pixel driving of the display and is for detecting the electromagnetic induction pen are operations of detecting the electromagnetic induction pen in a whole of the panel surface.

6. The sensor controller according to claim 3, wherein the first operation that is executed synchronously with the touch detection operation and is for detecting the electromagnetic induction pen takes a period of time that is longer than a time taken by the second operation that is executed synchronously with the pixel driving of the display and is for detecting the electromagnetic induction pen.

7. The sensor controller according to claim 3, wherein the program, when executed by the processor, causes the sensor controller to execute a detection operation for the electromagnetic induction pen for updating a position of the electromagnetic induction pen that has already been detected, synchronously with the pixel driving of the display after detecting the electromagnetic induction pen by the second operation that is executed synchronously with the pixel driving of the display and is for detecting the electromagnetic induction pen.

8. The sensor controller according to claim 3, wherein the second operation that is executed synchronously with the pixel driving of the display and is for detecting the electromagnetic induction pen is a detection operation for the electromagnetic induction pen for updating a position of the electromagnetic induction pen that has already been detected.

9. The sensor controller according to claim 8, wherein the second operation that is executed synchronously with the pixel driving of the display and is for detecting the electromagnetic induction pen is executed synchronously with a horizontal synchronization signal of the display.

10. The sensor controller according to claim 8, wherein the program, when executed by the processor, causes the sensor controller to execute the first operation that is executed synchronously with the touch detection operation and is for detecting the electromagnetic induction pen, when the electromagnetic induction pen is not detected as a result of execution of the second operation that is executed synchronously with the pixel driving of the display and is for detecting the electromagnetic induction pen.

* * * * *